US006685641B2

United States Patent
Liu (10) Patent No.: US 6,685,641 B2
(45) Date of Patent: Feb. 3, 2004

(54) PLANE WAVE SCANNING RECEPTION AND RECEIVER

(75) Inventor: D-L Donald Liu, Issaquah, WA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 0 days.

(21) Appl. No.: 10/061,402

(22) Filed: Feb. 1, 2002

(65) Prior Publication Data

US 2003/0149357 A1 Aug. 7, 2003

(51) Int. Cl.⁷ .................................................. A61B 8/00
(52) U.S. Cl. ....................................................... 600/443
(58) Field of Search ................................. 600/437, 443, 600/447; 73/602; 128/916

(56) References Cited

U.S. PATENT DOCUMENTS

| | | | |
|---|---|---|---|
| 4,550,607 A | | 11/1985 | Maslak et al. |
| 4,699,009 A | | 10/1987 | Maslak et al. |
| 5,148,810 A | | 9/1992 | Maslak et al. |
| 5,170,170 A | * | 12/1992 | Soumekh .................... 342/179 |
| 5,608,690 A | | 3/1997 | Hossack et al. |
| 5,628,320 A | * | 5/1997 | Teo ............................ 600/443 |
| 5,675,554 A | | 10/1997 | Cole et al. |
| 5,720,708 A | * | 2/1998 | Lu et al. ..................... 600/447 |
| 6,527,720 B1 | * | 3/2003 | Ustuner et al. ............. 600/443 |
| 6,551,246 B1 | * | 4/2003 | Ustuner et al. ............. 600/447 |

OTHER PUBLICATIONS

Jeong, M.K. et al., "Generation of Sinc Wave by a One-Dimensional Array for Application in Ultrasonic Imaging", IEEE Transactions of Ultrasonics, Ferroelectrics, and Frequency Control, Mar. 1996, vol. 43, No. 2, 285–295.

Jeong, M.K. et al., "Realization of Sinc Waves in Ultrasound Imaging Systems" Ultrasonic Imaging, 21, 173–185, 1999.

Lu, J., "Experimental Study of High Frame Rate Imaging with Limited Diffraction Beams", IEEE Transactions on Ultrasonics, Ferroelectrics, and Frequency Control, Jan. 1998, vol. 45, No. 1, 84–97.

Lockwood, G.R., et al., "Real–Time 3–D Ultrasound Imaging Using Sparse Synthetic Aperture Beamforming", IEEE Transactions on Ultrasonics, Ferroelectrics, and Frequency Control, Jul. 1998, vol. 45, No. 4, 980–988.

* cited by examiner

Primary Examiner—Francis J. Jaworski (57) ABSTRACT

Plane waves are transmitted at different incident angles, and the radio frequency echo waveforms received by the elements in an array are processed with a Fourier transform. This method is capable of generating one frame of "raw" image for each transmitted plane wave. The formation of each raw image includes: temporal Fourier transform of radio frequency echo signal from each element; phase rotation; spatial Fourier transform; complex interpolation; and an inverse spatial-temporal Fourier transform. This method does not require the synthesis of limited diffraction beams and is computationally more efficient compared to conventional delay-and-sum approach. These raw images are combined coherently to enlarge spatial frequency coverage and enhance lateral resolution. The resolution-enhanced images are further combined incoherently to achieve speckle reduction.

44 Claims, 4 Drawing Sheets

THE DATA IS ACQUIRED IN THE
FOLLOWING ORDER:

$\theta_1$ $\theta_4$ $\theta_2$ $\theta_5$ $\theta_3$ $\theta_6$

PLANE WAVE SCANNING RECEPTION AND RECEIVER

BACKGROUND

This invention relates to imaging, such as medical diagnostic ultrasound imaging. In particular, new receive processing methods and systems require few transmit and receive events to form an entire image.

Commercially available medical ultrasonic imaging systems use a large number of transmit and receive events for each frame of an image. Each transmit event steers a beam of ultrasonic energy along a particular scan line and focuses this energy to a particular focus depth. After each transmit event, echoes are received, amplified and digitized. A receive beamformer generates a line of the image by dynamically focusing and apodizing the receive signals along the scan line. These transmit and receive events are repeated many times to form an image. The imaging frame rate is limited by the total number of transmit and receive events, because each transmit and receive event takes a finite amount of time determined by the speed of sound, maximum depth of interest and any system overhead processing. Using multiple beams provides a high signal-to-noise ratio and contrast resolution with a simple implementation generally immune to tissue motion.

The time limitation to transmit and receive along multiple beams is particularly acute for three-dimensional imaging. For high quality real-time three-dimensional imaging, around 30 volumes per second where each volume consists of 100 frames of data are produced. This frame rate of 3000 frames per second is not feasible given the conventional method discussed above and the speed of sound and tissue of 1500 meters per second.

One unconventional technique for increasing frame rate for scanning a region is proposed in U.S. Pat. No. 6,551,246 the disclosure of which is incorporated herein by reference. Multiple unfocused or weakly focused plane waves are sequentially transmitted at different directions. The echoes received in response to each insonnification are digitized and stored for every channel, such as system channels each connected with an element of an array. The sets of stored receive signals are delayed and apodized in multiple iterations to form component beams for each desired image point in the region insonnified by the respective waves. The final images are synthesized by adding two or more of the component beams for each image point. However, the number of calculations performed by the receive beamformer for delaying, apodizing and generating a plurality of lines of information to generate the images is high.

In another proposed approach by J-Y Lu, "Experimental Study of High Frame Rate Imaging with Limited Diffraction Beams", IEEE Trans. Ultras., Ferroelec., and Freq. Contr., vol. 45, no. 1, 1998, a normal incident plane wave is used for transmit, and multiple limited diffraction beams are formed in receive.

BRIEF SUMMARY

The present invention is defined by the following claims, and nothing in this section should be taken as a limitation on those claims. By way of introduction, the preferred embodiments described below include a method and system for transmitting one or more plane waves into a region using a one-dimensional array to form a two-dimensional image. However, the method described here can be extended easily by those skilled in the art to three-dimensional imaging using a two-dimensional array. For signals received in response to each plane wave, a receiver applies a fast Fourier transform to generate image data. For plane waves normally incident to the transducer array, a two-dimensional Fourier transform is applied to data received for the elements or channels of the array. For plane waves transmitted at other transmit angles to the array, a Fourier transform is applied to the signals of each element independently. The resulting temporal frequency data is phased shifted as a function of the transmit angle. A Fourier transform is then applied across the elements or channels to generate spatial frequency data. The Fourier transform data is then interpolated or remapped as a function of scan angle, including the normal to the array, and any other desired variable. An inverse Fourier transform is applied to generate the image data. Either the Fourier transform data or the data generated by the inverse Fourier transform is combined for increased spatial resolution or a reduction in speckle.

Any one or more of the various aspects discussed above for receive processing allow for imaging with an increased frame rate. Further aspects and advantages of the invention are discussed below in conjunction with the preferred embodiments.

BRIEF DESCRIPTION OF SEVERAL VIEWS OF THE DRAWINGS

In the figures, like reference numerals designate corresponding parts or acts throughout the different figures.

DETAILED DESCRIPTION OF THE PREFERRED EMBODIMENTS

One or more plane waves are transmitted from an array, such as transmitting ultrasonic energy is a planar wave into tissue of a patient. The echo signals received at a plurality of the elements of the array are processed by a receiver. The receiver applies a fast Fourier transform, interpolation of frequency data, and an inverse fast Fourier transform to generate image data. The embodiments will be discussed below in reference first to a system and data flow, and second with reference to the theoretical derivation for applying Fourier transforms to receive data.

System and Data Flow

Figure 1:
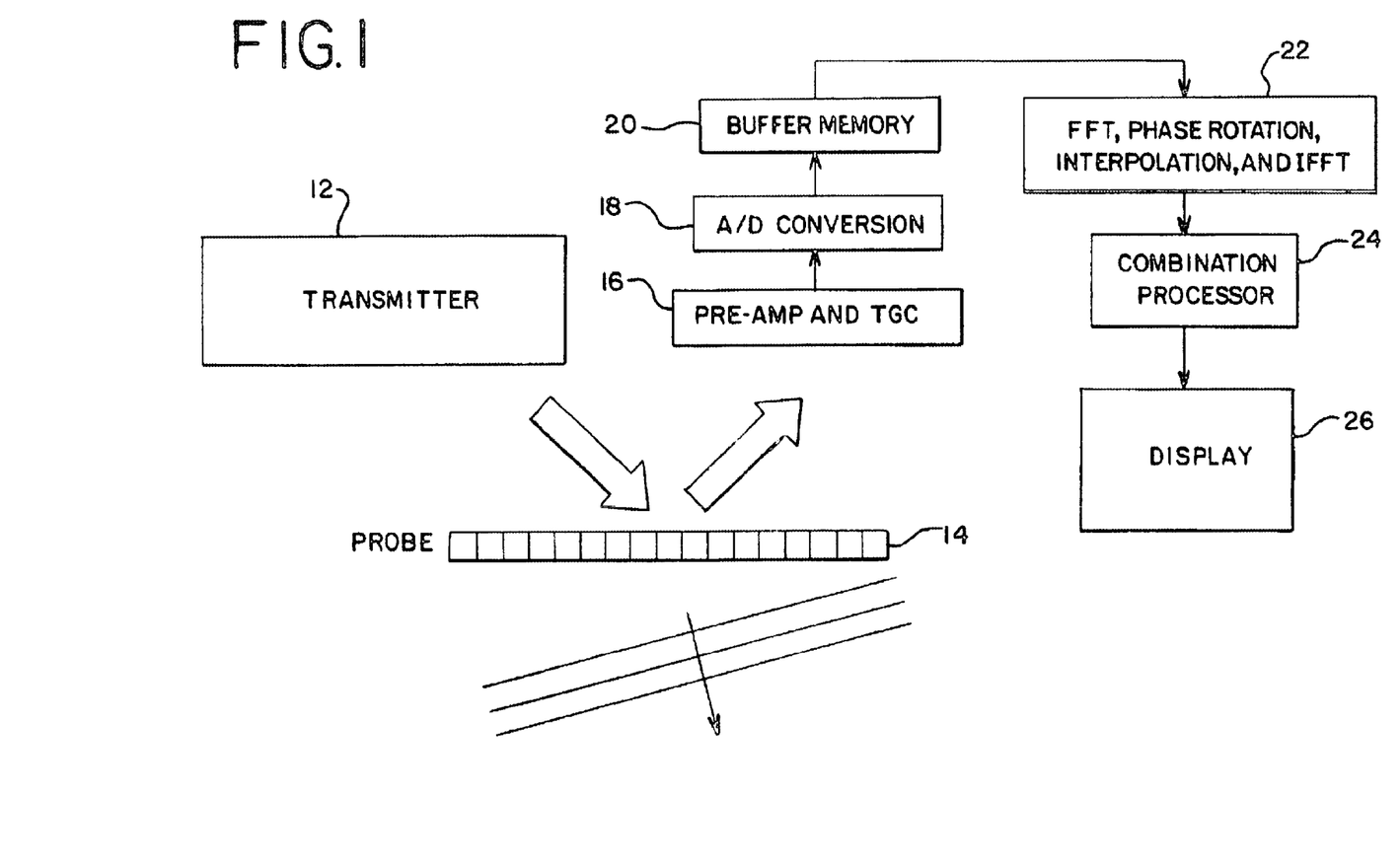
FIG. 1 is a block diagram of one embodiment of a system for applying Fourier transforms to generate image data in response to a transmitted plane wave.

FIG. 1 shows a block diagram of a system for transmitting plane waves and applying Fourier transforms to received data. The system 10 includes a transmitter 12, a transducer array 14, a pre-amplifier 16, and analog-to-digital converter 18, a buffer memory 20, a Fourier transform processor 22, a combination processor 24, and a display 26. Different, additional or fewer components may be provided, such as an additional processor between the combination processor 24 and the display 26 for performing various detection and/or image processing. In one embodiment, the system 10 comprises a medical diagnostic ultrasound system for transmitting acoustic energy, but the system 10 may be used for other applications, such as radar synthetic aperture, sonar synthetic aperture, optical interferometry, radio interferometry or seismic processing.

The transmitter 12 includes analog and/or digital components for generating a planar wave. The transmitter 12 applies transmit signals to individual elements of the transducer array 14, and these transmit signals are timed and phased to cause the transducer array 14 to generate unfocused or weakly focused ultrasonic waves that insonnify a region from one or more angles. Conventional transmit beamformers of ultrasound systems may be used for generating a planar wave, such as the transmitters disclosed in U.S. Pat. Nos. 4,550,607; 4,699,009; 5,148,810; 5,608,690; and 5,675,554.

To compensate for undesired divergence, a mildly focused planar wave is generated. The energy generated by each element of the transducer array 14 is delayed relative to other elements to steer or mildly focus a plane wave. A Gaussian or hamming apodization function is applied across the transducer array 14 to reduce edge waves generated by the finite aperture provided by the transducer array 14. Since no specific transmit focal points are specified, dynamic transmit focusing is realized by the superposition of transmitting plane waves at different angles to the transducer array 14. Other techniques for generating plane waves, such as using other types of apodization or using a mildly diverging plane wave may be used.

In another embodiment, coded excitations are used. For example, a chirp signal or frequency coding may allow for simultaneous transmission of plane waves at different angles. Orthogonal coding may also be used. The received echo signals are decoded for each element of the receive aperture prior to application of the Fourier transform. Alternatively, the decoding can be performed after the temporal Fourier transform of each received signal.

The transducer array 14 comprises one-dimensional or multi-dimensional array of elements. Linear, curved linear, phased or other arrays may be used. In one embodiment, the elements are spaced at half a wavelength of the transmitted wave. Other pitches may be used.

Echo signals generated in response to the plane wave are received by the transducer array 14 and converted to electrical analog signals. The signals are routed to the preamplifier 16 by a transmit receive switch or a different transducer array 14 is used for transmit and receive functions. The preamplifier 16 comprises a variable amplifier for amplifying the analog signals and applying depth gain compensation to account for attenuation of energy as a function of depth within the tissue. The amplified signals are converted to digital signals by the analog-to-digital converter 18. For example, a 40 Megahertz sample rate is used, but other rates may be provided. Digitized data for each of the elements of the receive aperture or a plurality of elements of the transducer array 14 are stored in the buffer memory 20 or passed to the Fourier transform processor 22 and then stored in the buffer memory 20.

The buffer memory 20 comprises a random access memory or other memory device for storing digital data. In one embodiment, the buffer memory 20 comprises a plurality of different memory devices for storing data before and after application of a Fourier transform and after application of an inverse Fourier transform. Sufficient memory is provided for storing data associated with at least one plane wave transmission and corresponding receive processing. In alternative embodiments, sufficient memory is provided for storing digital data associated with a plurality of plane wave transmissions and corresponding received data.

The Fourier transform processor 22 comprises one or more application specific integrated circuit, general processor, digital signal processor, other processor or combinations thereof for applying a fast Fourier transform, phase shifting, interpolating and/or applying an inverse fast Fourier transform. In one embodiment, the processor 22 comprises a plurality of processors. For example, the processors are staged as a function of the data flow. One or a plurality of processors are provided for applying a fast Fourier transform to receive data for the individual elements or channels. Another processor applies a fast Fourier transform to generate spatial frequency data from the temporal frequency data from the first processor. Yet another processor applies the inverse Fourier transform. Any one or more of the above described processors may be combined into a single processor or further separated into a plurality of processors. Other Fourier transform related processes, such as phase shifting and interpolation of frequency data, are performed by one or more of the processors described above or yet further separate processors. Fourier transforms as used herein include Sine and Cosine transform analogs.

The combination processor 24 includes an application specific integrated circuit, general processor, digital signal processor, other processor or combinations thereof. In one embodiment, the combination processor 24 comprises in whole or in part one or more of the processors discussed above for the Fourier transform processor 22. The combination processor 24 combines data associated with two or more plane wave transmissions at different angles. The combination provides resolution enhancement and speckle reduction. The data is combined in (1) the frequency domain after interpolation and before inverse fast Fourier transformation and/or (2) after application of the inverse fast Fourier transform. In alternative embodiments, the combination processor 24 is absent from the system 10.

The preamplifier 16, analog-to-digital converter 18, buffer memory 20, Fourier transform processor 22 and combination processor 24 comprise a Fourier transform based receiver. In alternative embodiments, a Fourier transform receiver includes only the entire or part of the Fourier transform processor 22 or other subset of components. Additional components may also be included in the Fourier transform receiver. The Fourier transform receiver generates data representing particular locations within a region from data received in response to a plane wave transmission.

The data representing points, areas or volumes of the image region are provided to the display 26. Detection, scan conversion, image processing, or other processes may be performed for generating an image on the display 26.

Figure 2:
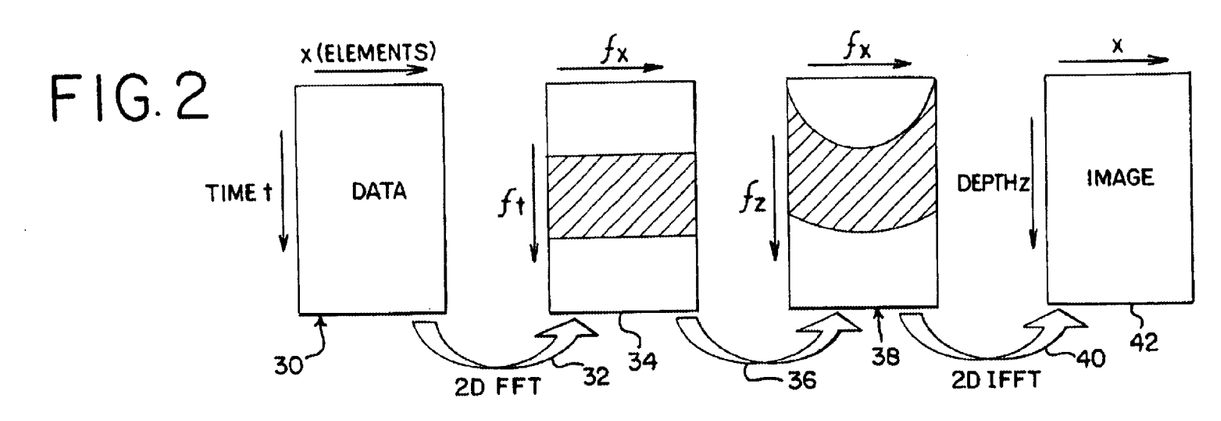
FIG. 2 is a data flow diagram of one embodiment for generating image data using Fourier transforms in response to a plane wave transmitted normal to an array.
Figure 3:
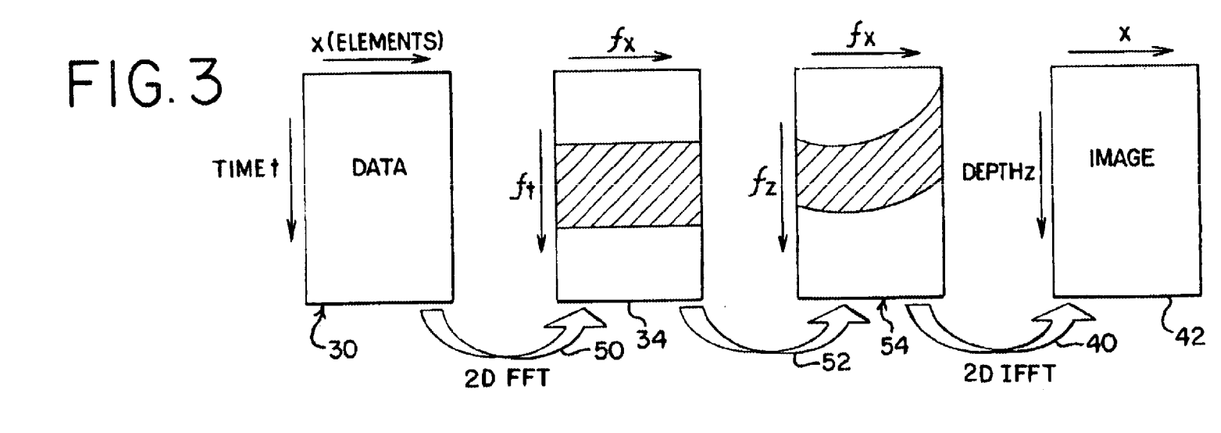
FIG. 3 is a data flow diagram of one embodiment for generating image data using Fourier transforms in response to plane waves transmitted at non-normal angles to an array.

FIGS. 2 and 3 show the data flow of the fast Fourier transform and inverse fast Fourier transform processes of the Fourier transform receiver. FIG. 2 represents the Fourier transform and inverse Fourier transform for receive data responsive to a transmit plane wave normal to the transducer array 14. FIG. 3 represents the data flow for receive data responsive to transmit plane waves at non-normal or other angles to the transducer array 14.

For the data flow of FIGS. 2 and 3, radio frequency (amplitude and phase) or in-phase and quadrature (real and imaginary) data for each element of the receive aperture is acquired as a function of time. For in-phase and quadrature data, a mixer is provided for each element of the receive aperture. The data field 30 represents data from a plurality of azimuthally spaced elements along an X dimension as a function of time (i.e., range). The data of the data field 30 is responsive to a single plane wave transmission.

The plane wave is transmitted normal to the transducer array 14 by transmitting from each of or a subset of the elements of the transducer array 14 at a same time or at a time symmetrical about the center of the transducer array 14 or transmit aperture. For non-normal plane wave transmissions, the delay profile increases or decreases linearly from one end of the transducer array 14 to the other. Each element is equally apodized or another apodization function is applied, such as a Gaussian or Hamming functions. In one embodiment, all available elements of the transducer array 14 are used for transmit and receive apertures. The transmitted plane wave comprises a highly collimated beam covering a region of tissue to be imaged. The width of the beam is represented generally by the aperture width, and the diffraction distance is the so-called Raleigh distance. For typical ultrasound imaging frequencies and aperture size, this distance is large compared to typical imaging depths. For a 30 mm aperture at 5 Megahertz, for example, this distance is about 1 meter. Practically, then, the transmitted plane wave has the same width as the transmit aperture and the frequency spectrum, instead of having infinitesimal width, has a finite width on the order of one over the aperture width.

The data field 30 FIGS. 2 and 3 is obtained by receiving data as a function of time for each of the elements of the receive aperture. The receive data is obtained starting after the transducer array 14 has generated the plane wave (e.g., time zero). In alternative embodiments, the receive data is obtained after a delay from time zero. If data is collected after a delay, temporal frequency data generated as a function of application of a Fourier transform along the time dimension is phase shifted as a function of the frequency and the delay time.

In act 32, a fast Fourier transform is applied to both the time and X dimension. A two-dimensional fast Fourier transform is applied to transform both dimensions simultaneously. A two-dimensional Fourier transform is represented as equation:

$$S_\omega(f_x) = \int\int s(x,t)e^{j2\pi(xf_x+tf)}dt dx$$

where s(x,t) is the echo signal received at position (x, z=0).

In another embodiment, separate fast Fourier transforms are applied to data along both dimensions. Temporal frequency data is generated by applying a fast Fourier transform to data along the time dimension. In one embodiment, zero values are added to the data along the time dimension to increase the sample rate in the frequency domain. For example, the number of data values along the time dimension is doubled by appending zero values to the original data. The original data may be windowed in the time dimension to reduce frequency sidelobe. In one embodiment, the original data is offset in the time direction by half of the record length to reduce the high frequency oscillation in its Fourier transform. The fast Fourier transform is applied separately to the data for each of the elements of the receive aperture. Independent Fourier transforming along the time dimension for each of the elements generates temporal frequency data.

A fast Fourier transform is applied along the azimuthal or X dimension to generate spatial frequency data from the temporal frequency data. The data field 34 represents the Fourier transformed spatial and temporal frequency data. $f_x$ represents the spatial frequency dimension and $f_T$ represents the temporal frequency dimension of the data field 34.

In act 36, the frequency data field 34 is interpolated or remapped. The shaded area of FIG. 2 represents the region for which data is available due to the limited temporal and spatial bandwidths of the transducer. The data 34 in the $(f_x, f_t)$ domain is interpolated to yield data 38 in the $(f_x, f_z)$ domain. In one embodiment for interpolating data responsive to a plane wave transmitted normal to the transducer array 12, the equation:

$$f_t = \frac{c}{2}\left(\frac{f_x^2}{f_z} + f_z\right) \tag{A}$$

is used to compute the value of $f_t$ for interpolation. Remapping or interpolation transforms the data that is evenly sampled on a rectangular grid in the $(f_x, f_t)$ domain to data that is evenly sampled in the $(f_x, f_z)$ domain. The interpolation is performed using spline interpolation, though other techniques such as nearest neighbor linear interpolation, polynomial interpolation, or low-pass filtering can also be used. Before or after interpolation, the data is windowed in the $(f_x, f_t)$ domain or the $(f_x, f_z)$ domain to achieve the effects of dynamic aperture growth and sidelobe reduction.

In act 40, a two-dimensional inverse fast Fourier transform is applied to the interpolated frequency data of the data field 38. In alternative embodiments, separate inverse Fourier transforms are applied to the spatial and interpolated temporal frequency dimensions. The result of the application of the inverse fast Fourier transform is data representing the azimuth and range dimensions of the region of the patient. The data comprises radio frequency or in-phase and quadrature data.

FIG. 3 shows a data flow similar to FIG. 2. Since the plane wave is transmitted at a non-normal angle to the transducer array 14, separate temporal and spatial fast Fourier transforms are applied to the data field 30. Act 50 includes a temporal Fourier transform of each echo signal, followed by phase rotation in the temporal frequency data as a function of the angle from the normal. The temporal phase rotation corresponds to a lateral frequency shifting in the spatial frequency domain, and eliminates the need of interpolation in the lateral spatial frequency dimension (the $f_x$ dimension). After temporal phase rotation, the spatial fast Fourier transform is applied to the resulting data. In act 52, data points that are regularly sampled in the $f_t$ dimension are remapped (interpolated) to yield data points that are regularly sampled in the $f_z$ dimension. For each value of $f_z$, the temporal frequency data $f_t$ is determined using the equation:

$$f_t = \frac{c}{2}\left(\frac{f_x^2 + f_z^2}{f_z\cos\theta + f_x\sin\theta}\right) \tag{B}$$

Similar to the non-steered case, before or after interpolation, the data is windowed in the $(f_x, f_t)$ domain or the $(f_x, f_z)$ domain to achieve the effects of dynamic aperture growth and sidelobe reduction. The spatial frequency coverage is determined by the bandwidth and element directivity of the transducer, as well as by the steering angle of the transmit plane wave. The coverage is represented by the shaded area in frequency data field 54.

Since element directivity is a function of frequency, a larger aperture is ideally used with lower frequency components than with higher frequency components. A desired aperture size is obtained by removing data representing signals beyond the known acceptance angle of individual elements. The operation is represented as:

$$S'_w(F_x) = S_w(F_x)A(\theta)|_{\theta=a\sin(cfx/f)},$$

where $S_W(f_x)$ is the frequency data field 34, $A(\theta)$ is the windowing function, and c is the speed of sound in tissue. In alternative embodiments, the angle used is limited to always be within the acceptance angle of any individual element. In yet other alternative embodiments, no adjustment is provided for a constant F number imaging as discussed above. The interpolated frequency data field 54 represents the scan region of the patient in the frequency domain. In act 40, the two-dimensional inverse fast Fourier transform is applied to provide the image data field 42.

Generally, image data generated with Fourier transforms allows for an increased frame rate over conventional system using fewer calculations. The two dimensional fast Fourier transform and inverse fast Fourier transform require $5MNLog_2$ (MN) calculations where M is the number of channels or elements in the transducer array 14 and N is the number of samples for each of the channels M. The two-dimensional fast Fourier transform and inverse fast Fourier transform generates M beams or lines along the range dimension. For conventional beam forming, each sample of radio frequency data is delayed by a varying amount for dynamic receive beam forming. If 10 samples are used in interpolation, then interpolating each radio frequency waveform requires 10 N operations so 10 MN operations are needed for each beam. The total amount of operations for M beams is 10 $M^2N$. The ratio of these two numbers of operations is $2M/Log_2(MN)$. If M=500 and N=5000 for an imaging depth of about 10 cm, this ratio equals about 47. So, for this condition, the amount of computation is reduced by a factor of 47 by the current invention compared to conventional delay-and-sum beamforming.

Figure 4:
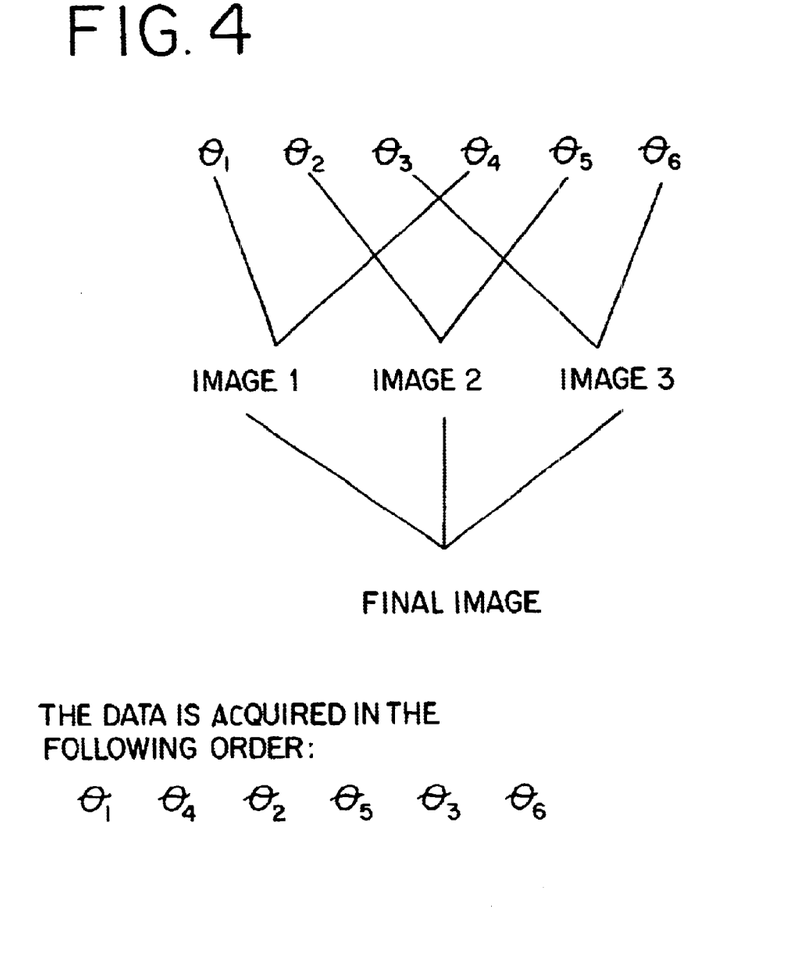
FIG. 4 is a graphical representation of one embodiment of a combination of receive data responsive to plane wave transmissions at different angles.

In one embodiment, receive data associated with transmissions of multiple plane waves at different angles are combined. Two, three or more (e.g. nine) sets of receive data associated with two, three, or more different angles relative to the transducer array 14 are combined. FIG. 4 shows one embodiment for combining six sets of receive data associated with six different angles. Fewer or greater number of sets of receive data may be used, and sets of receive data associated with a same angle may also be used.

Data is combined either in the frequency domain or spatial domain. In one embodiment, interpolated frequency data sets 38, 54 (see FIGS. 2 and 3) are combined. In alternative embodiments, two sets of interpolated frequency data 54 associated with different non-normal angles of transmission are combined. The interpolated frequency data sets for different incident angles are combined prior to application of the inverse fast Fourier transform. Combination of the frequency data increases the area of coverage in the spatial frequency domain and improves the spatial resolution. Data sets are combined by addition in either the frequency domain or the spatial domain. More than two sets of data can be combined coherently. Weighted combinations may also be used to achieve better control of sidelobe levels or for performance optimization.

As shown in FIG. 4, three sets of pairs of interpolated frequency data sets 54 are combined into three respective sets. In one embodiment, each pair of interpolated frequency data sets are obtained sequentially to reduce motion artifact. For the example shown in FIG. 4, the data associated with the first and fourth angles are transmitted and received sequentially, followed by the transmission and reception of data associated with the second and fifth angles, and followed by the transmission or reception of data associated with the third and sixth angles. Each angle associated with the transmit plane wave is as different as possible to maximize the spatial resolution given the spacing and directivity of the transducer elements.

Additionally, or alternatively, data sets associated with different plane wave transmission angles are combined after application of the inverse fast Fourier transform. The combination is performed prior to amplitude detection or after amplitude detection. Combination after detection increases speckle reduction. As shown in FIG. 4, a two-dimensional inverse fast Fourier transform is applied to the three different sets of data to generate three image data sets 42. The image data sets 42 are averaged or added with different weightings or otherwise combined to generate a final image for viewing by the user or for processing and viewing.

By combining data prior to amplitude detection, tissue motion may create artifacts. By using as few frames as possible in such combinations and sequentially acquiring the combined frames, motion artifacts are minimized. Combining after amplitude detection is less susceptible to motion artifacts. As shown in FIG. 4, the combination of the image data sets 42 into the final image may occur after amplitude detection to minimize motion artifacts. Alternatively, image data sets 42 are combined prior to amplitude detection. In one embodiment, amplitude detection is provided as part of the inverse fast Fourier transform, such as using a Hilbert transform. Information associated with negative frequencies are removed so that the inverse fast Fourier transform provides complex detected image information or an amplitude value. Alternatively, conventional B-mode or other detection of the final image data set is used.

For real time imaging, the process of FIG. 4 is repeated for every group of data sets. Alternatively, a moving window associated with combinations of different sets of previously acquired information and at least one new set of information identifies data to be combined to generate sequential images.

Given a single transmission or a limited number of transmissions for each final image and the computational efficiency of generating image data with Fourier transforms, real time or rapid three-dimensional imaging may be provided. A one-dimensional transducer is moved to scan various two-dimensional planes or a multidimensional array is used to obtain a plurality of images associated with different planes within a region for three-dimensional imaging. Alternatively, a two-dimensional array with a three-dimensional plane wave transmission (e.g. unfocussed in elevation) is used to scan a volume with a single transmit event. A three-dimensional Fourier transform and inverse Fourier transform provide image data associated with a three-dimensional region of a patient. In either alternative, a fewer number of transmit events and associated receive events are required for generating an image of a three-dimensional volume of a patient.

Other techniques may be used for fast Fourier transform based reception. For example, phase aberration correction is provided. A conventional focused transmit wave front is synthesized from data received from pulse plane waves. The synthesized data is cross correlated to find time delay errors assuming no tissue motion. The time delay errors are used to adjust the time delays for subsequent transmission of plane waves and the time delays of the received echo signals. Other alterations of any of the fast Fourier transform, phase shifting, interpolation, and inverse fast Fourier transform formulas may be provided for phase aberration correction or other alteration of scanning.

Prior to combination or after any combination, Doppler or color flow information or B-mode information is generated. For Doppler or color flow imaging, lower sensitivity due to unfocused transmit beams is offset by the higher frame rate achievable. Where transmit beamformers, receive beamformers and the Fourier transform receiver discussed herein are used, a combination of conventional beam formation and Fourier transform image formation may be used. For example, Doppler or color flow images are generated conventionally and B-mode images are generated at a high frame rate using Fourier transforms.

As an alternative to a combination of conventional beam forming and Fourier transform based reception, the Fourier transform receiver discussed herein processes data to identify one or more beams in an image region. The beams are then combined and used as in conventional systems. For example, a selectable number of parallel receive beams are generated using the Fourier transform receiver while the transmit beam is a conventional focused or weakly focused beam.

Theory:

Application of the Fourier transform, interpolation in the frequency domain and inverse Fourier transform provide data representing an area or volume of a patient, such as data provided by conventional receive beamformation. The Fourier transform process or angular spectrum-based approach may be altered to include techniques used in conventional beamforming, such as dynamic focusing, aperture growth, etc. Fourier transform based reception of data is performed for plane waves transmitted at a normal to the transducer array 14 or at an angle away from the normal line.

Nnormal Incidence (0°)

For 2-D space, the object scattering function is represented as $\gamma(x, z)$, and the incident plane wave propagating along the z axis is represented as $p(t-z/c)$. The backscattered wave propagates back to the array as $H_0^{(1)}$ (kr) for a single frequency component, where $H_0^{(1)}$ (kr) is the zeroth order Hankel's function of the first kind and is the Green's function for the 2-D wave equation. $H_0^{(1)}$ (kr) approaches an outgoing cylindrical wave for large r, where r is the distance between a point scatter at $(x_0, z_0)$ and the point of reception on a linear array $(x, z_0=0)$.

Therefore, for a single frequency component, the received signal at the aperture at location x is $$S_\omega(x) = \int\int \gamma(x_o, z_0) P_\omega e^{-jkz_0} H_0^{(1)}(kr) dx_0 dz_0 \quad (1)$$

where $P_\omega$ is the spectrum of the tx pulse, $r=\sqrt{(x-x_0)^2+z_0^2}$, $\omega=2\pi f$, and $k=2\pi/\lambda$.

Eq. (1) represents a convolution in x. A Fourier transform is performed in x. The Fourier transform of $H_0^{(1)}$ $(k\sqrt{x_2+z^2})$ with respect to x is $$\int_{-\infty}^{\infty} H_0^{(1)}\left(k\sqrt{x^2+z^2}\right) e^{j2\pi f_x x} dx = \frac{-2}{k\sqrt{1-\lambda^2 f_x^2}} e^{-k|z|\sqrt{1-\lambda^2 f_x^2}} \quad (2)$$

Therefore, the Fourier transform of Eq. (1) yields $$S_\omega(f_x) = \int \Gamma(f_x, z_0) P_\omega e^{-jkz_0} \frac{-2}{k\sqrt{1-\lambda^2 f_x^2}} e^{-jkz_0\sqrt{1-\lambda^2 f_x^2}} dz_0, \quad (3)$$

or, $$\int \Gamma(f_x, z_0) e^{-jkz_0(1+\sqrt{1-\lambda^2 f_x^2})} dz_0 = -\frac{k\sqrt{1-\lambda^2 f_x^2}}{2P_\omega} S_\omega(f_x). \quad (4)$$

This result suggests that the angular spectrum of the received wavefront equals to the 2-D Fourier transform of the object evaluated at:

$$f_z = \frac{1}{\lambda} + \sqrt{\frac{1}{\lambda^2} - f_x^2} \quad (5)$$

The highest value of $f_z$ occurs with the minimum wavelength $\lambda_{min}$ (or the highest temporal frequency) and $f_x=0$, and equals $2/\lambda_{min}$. To invert the Fourier transform in Eq. (4), the data on the right-hand side is sampled uniformly in $\omega$. The data is resampled evenly in terms of $f_z$. Given $f_z$, the wavelength $\lambda$ can be computed using Eq. (5) as $$\lambda = \frac{2f_z}{f_x^2 + f_z^2} \quad (6)$$

and the corresponding temporal frequency is given by $f=c/\lambda$. Therefore, the image formation process can be summarized into the following steps:

1. Given received signals s(x, t), perform a 2-D FFT to obtain $S_\omega(f_x)$.
2. Modify $S_\omega(f_x)$ according to the right-hand side of Eq. (4). Dividing by $P_\omega$ corresponds to deconvolution using the known incident pulse, which can be replaced by Wiener filtering. It can also be replaced by a matched filtering or ommitted altogether.
3. Resample the data according to uniform $f_z$. The relation between $f_z$ and the temporal frequency $f$ is $$f = \frac{c}{2}\left(\frac{f_x^2}{f_z} + f_z\right). \quad (6A)$$

Figure 5:
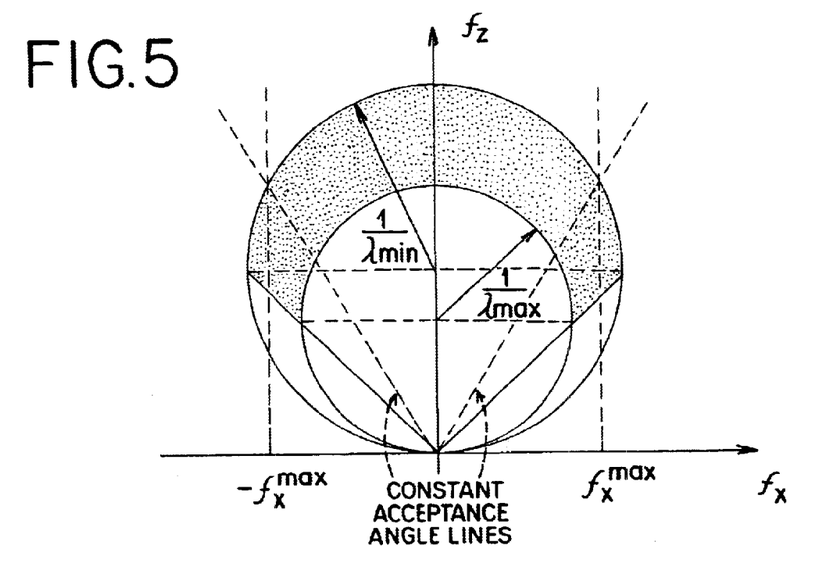
FIG. 5 is a graphical representation of one embodiment of the spatial frequency coverage for a plane wave transmitted normal to an array.

Since data is available only for a limited frequency range $(f_{lo}, f_{hi})$, the corresponding data is also available for a limited frequency range in $f_z$ though the range also depends on $f_x$ (see FIG. 5).

4. Perform an inverse 2-D FFT to obtain $\gamma(x, z)$, which is the scattering strength distribution, and represents an image.

Examining the spatial frequency coverage based on Eq. (5) and for a fixed temporal frequency, the coverage is a half-circle $$\left(f_z - \frac{1}{\lambda}\right)^2 + f_x^2 = \frac{1}{\lambda^2} \quad (7)$$

as $f_x$ varies between $\pm 1/\lambda$. In practice, the value of $f_x$ varies between $\pm f_x^{max}=\pm\frac{1}{2}$ d where d is element pitch, so only arrays with $\lambda/2$ pitch or finer can attain the full half-circle coverage. Furthermore, if the acceptance angle of each element is limited to the range $\pm\theta^{max}$, then fx is limited to ±sin($\theta^{max}$)/$\lambda$. When the temporal frequency changes, the radius of the circle changes sweeping an area as shown in FIG. 5.

Temporal Offset

If received data is obtained starting from $t_0$ corresponding a depth $ct_0/2$, then the Fourier transform $S_{107}(f_x)$ of the data is phase-shifted by multiplication with $e^{-j2\pi ft0}$ in Eq. (4). In conventional dynamic receive focusing methods, the focusing curvature applied by the system matches the wavefront curvature from the targets at each depth. In this sense, applying the phase shifting in this Fourier transform method has the effect of matching the focusing with the actual wavefront.

Angled Incidence (> or <0°)

For an incident wave at angle $\theta$, the wavefront at a single frequency is represented as $$P_\omega e^{-j2\pi(x\sin\theta + z\cos\theta)/\lambda}.$$

Let $$k_{x0} = 2\pi f_{x0} = 2\pi \frac{\sin\theta}{\lambda} \text{ and } k_{z0} = 2\pi f_{z0} = 2\pi \frac{\cos\theta}{\lambda} \quad (8)$$

Eq. (1) is then modified as $$S_\omega(x) = \int\int \gamma(x_0, z_0) P_\omega e^{-j(k_{x0}x_0 + k_{z0}z_0)} H_0^{(1)}(kr) dx_0 dz_0 \quad (9)$$

A Fourier transform is performed with respect to x. Notice that $$\int \gamma(x_0, z_0) e^{-jk_{z0}x_0} e^{-j2\pi f_x x_0} dx_0 = \Gamma(f_x + f_{x0}, z_0) \quad (10)$$

so Eq. (10) (the equivalent of Eq. (4) for normal incidence case) becomes $$\int \Gamma(f_x + f_{x0}, z_0) e^{-jz_0(k_{z0} + k\sqrt{1-\lambda^2 f_x^2})} dz_0 = -\frac{k\sqrt{1-\lambda^2 f_x^2}}{2P_\omega} S_\omega(f_x). \quad (11)$$

Inversion of this formula requires spatial frequency shifting in the $f_x$ direction and remapping in the $f_z$ direction. After spatial frequency shifting, the result is $$\int \Gamma(f_x, z_0) e^{-jz_0(k_{z0} + k\sqrt{1-\lambda^2 f_x^2})} dz_0 = \quad (12)$$

$$-\frac{k\sqrt{1-\lambda^2(f_x - f_{x0})^2}}{2P_\omega} S_\omega(f_x - f_{x0}).$$

From Eq. (12), the formula relating $f_z$ and temporal frequency (replacing Eq. (5)) is $$f_z = \frac{\cos\theta}{\lambda} + \sqrt{\frac{1}{\lambda^2} - \left(f_x - \frac{\sin\theta}{\lambda}\right)^2} \quad (13)$$

which can be solved for $\lambda$ as $$\lambda = \frac{2f_z\cos\theta + 2f_x\sin\theta}{f_x^2 + f_z^2} \quad (14)$$

Figure 6:
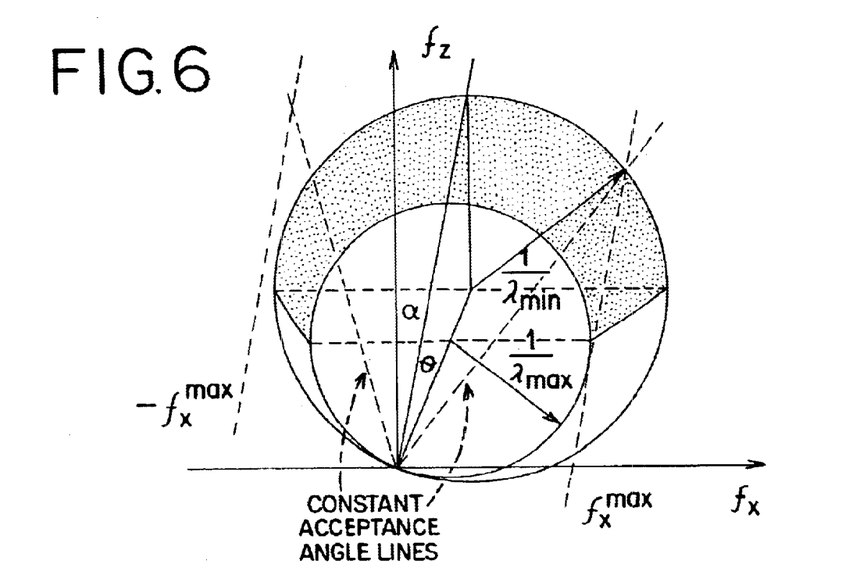
FIG. 6 is a graphical representation of one embodiment of the spatial frequency coverage for plane waves transmitted at a non-normal angle to the array.

The corresponding spatial frequency coverage is depicted in FIG. 6. As before, for a given array with element pitch d, the range of spatial frequencies for which data is available is ±½ d. However, this frequency range applies to the raw data. After the frequency shifting by $f_{x0}$, the corresponding spatial frequency coverage for the image becomes ($-\frac{1}{2}$ d+$f_{x,0}$, $\frac{1}{2}$ d+$f_{x,0}$). The condition for attaining full spatial frequency coverage spanned by the half circles is still $d<\lambda_{min}/2$.

The constant acceptance angle lines are centered around a line that passes through the peaks of each half circle. According to Eq. (11), the data $S_\omega(0)$ provides information about the Fourier transform of $\gamma(x, z)$ at the following spatial frequency:

$$f_x=f_{x0}=\sin\theta/\lambda, f_z=(1+\cos\theta)/\lambda \quad (15)$$

As temporal frequency varies, these points form a line at an angle $\alpha$ with the $f_z$ axis specified by $$\tan\alpha = \frac{\sin\theta}{1+\cos\theta} = \tan\left(\frac{\theta}{2}\right) \quad (16)$$

or $\alpha=\theta/2$. Symmetric to this line, the constant acceptance angle lines and the constant maximum lateral frequency lines are drawn. For acceptance angle $\pm\theta_1$, the spatial frequencies are $f_x=(\pm\sin\theta_1+\sin\theta)/\lambda$, $f_z=(\cos\theta_1+\cos\theta)/\lambda$.

If the steering angle $\theta$ equals to the maximum acceptance angle $\theta_1$, then, using two transmit events at steering angles $\pm\theta$, the maximum spatial frequency coverage in $f_x$ direction can be achieved.

Comparing FIGS. 5 and 6, the angled incidence has a smaller spatial frequency coverage compared to normal incidence for the same acceptance angle. However, by combining data associated with multiple angles of incidence, a larger spatial frequency coverage is achieved. The maximum spatial frequency coverage is limited by the following factors: bandwidth, element pitch, and element directivity (acceptance angle).

The spatial frequency shifting of $S_\omega(f_x)$ by $f_{x0}$ as required in Eq. (12) can be achieved by time-shifting the original data s(t, x), as shown in the following. The inverse Fourier transform of $S_\omega(f_x-f_{x0})$ in x is $$S_\omega(x)e^{-j2\pi x f_{x0}} = S_\omega(x)e^{-j2\pi x f\sin\theta/c}, \quad (17)$$

and its inverse Fourier transform in t is s(t−x sin$\theta$/c, x), which represents a linear time-shifting of the received data.

Constant F-Number Imaging

A constant f-number is used in conventional b-mode imaging generally for two reasons. First, due to element directivity, a large aperture is not used in the nearfield because the edge elements do not contribute to focusing and add clutter. Second, constant F-number imaging maintains a uniform image resolution at all depths. However, element directivity is a function of frequency, so a larger aperture is used with lower frequency components than with higher frequency components. This is not usually done in conventional beamforming as it adds complexity, but can be easily implemented in the Fourier transform based reception as described below.

The 2-D Fourier transform of the received data (in time and space directions) is $S_\omega(f_x)$, each value representing a component plane wave received by the whole array at the temporal frequency ω and incident angle θ=a sin(λ$f_x$). Given this, data points representing locations beyond the known acceptance angle of individual elements are removed. Since a straight line passing through the origin in the $f_z$~$f_x$ plane represents a constant acceptance angle (see FIGS. 5 and 6), this method implies excluding data that lie beyond those lines (away from the $f_z$ axis). On the other hand, the element directivity is given by $$\frac{\sin\left(\pi d \frac{\sin\theta}{\lambda}\right)}{\pi d \frac{\sin\theta}{\lambda}} \cos\theta = \frac{\sin(\pi d f_x)}{\pi d f_x} \cos\theta \quad (18)$$

Therefore, ignoring the cosθ obliquity factor, acceptance based on constant directivity implies acceptance based on constant range of $f_x$, and the spatial frequency domain limits would be two parallel lines at ±$f_\lambda^{max}$, also indicated in FIGS. 5 and 6. The lower temporal frequency components provide slightly larger spatial frequency coverage with the constant directivity approach versus the constant acceptance angle approach.

Phase Aberration Correction

One approach to implement phase aberration correction with data collected from plane waves of different incident angles is to synthesize a conventional focused transmit wavefront using the pulse plane waves, then use cross-correlation of the synthesized data to find time-delay errors assuming no tissue motion.

Denote the received signal corresponding to incident angle θ as s(x, t; θ), and denote the focused transmit wavefront as p(x, t). The angular spectrum of p(x, t) is $$P(f_x, f) = \int\int p(x, t) e^{-j2\pi(xf_x+tf)} dx dt \quad (19)$$

P($f_x$, f) represents a single-frequency plane wave with incident angle θ=a sin(c$f_x$/f), and the response of the medium to such a plane wave is simply S(x, f; θ) which is the Fourier transform of s(x, t; θ) with respect to t. Therefore, the medium response to P($f_x$,f) is P($f_x$, f)S(x, f; θ), and the total response to p(x, t) is given by the inverse Fourier transform $$q(x, t) = \int\int P(f_x, f) S\left(x, f; a\sin\left(\frac{cf_x}{f}\right)\right) e^{j2\pi(xf_x+tf)} df_x df \quad (20)$$

This approach can be used to synthesize the medium response to arbitrary incident waves, including waves produced by exciting each element with arbitrary waveforms. Once the medium's response to a focused transmit wavefront has been synthesized, conventional approaches to aberration estimation and correction can be applied.

While the invention has been described above by reference to various embodiments, it should be understood that many changes and modifications can be made without departing from the scope of the invention. The data may be apodized or filtered in the spatial-time domain (e.g. (x, t)), spatial-temporal frequency domain (e.g. (x, ft)), spatial frequency-temporal frequency domain (e.g. (fx, ft)), or lateral and axial spatial frequency domain (e.g. (fx, fz)). The purpose of this action is to suppress sidelobe or clutter caused by the finite aperture size, the limited bandwidth and the limited acceptance angle of individual elements. It is therefore intended that the foregoing detailed description be understood as an illustration of the presently preferred embodiment of the invention, and not as a definition of the invention. It is only the following claims, including all equivalents, that are intended to define the scope of this invention.

What is claimed is:

1. An ultrasound method for scanning with a plane wave transmission, the method comprising:
   (a) transmitting at least a first substantially planar ultrasonic wave into a region at an angle relative to the array;
   (b) receiving signals responsive to (a) at each of at least one element of an array;
   (c) applying a Fourier transform to the signals from each of at least one element; and
   (d) interpolating frequency data responsive to an output of (c) as a function of the angle.

2. The method of claim 1 wherein (c) comprises applying the Fourier transform to radio frequency signals from each of the at least one element.

3. The method of claim 1 wherein (a) comprises transmitting at an angle from a normal to the array; and
   further comprising:
   (e) phase shifting frequency data responsive to an output of (c) as a function of the angle.

4. The method of claim 1 further comprising:
   (e) repeating (c) for a plurality of elements of the array; and
   (f) applying a spatial Fourier transform to frequency data responsive to an output of (c) and (d).

5. The method of claim 1 wherein (c) comprises applying a two-dimensional Fourier transform to the signals from a plurality of elements of the array.

6. The method of claim 1 further comprising:
   (e) applying an inverse Fourier transform to the interpolated frequency data.

7. The method of claim 1 wherein (a) comprises transmitting with the angle away from a normal to the array.

8. The method of claim 1 further comprising:
   (e) transmitting at least a second substantially planar ultrasonic wave into the region, the second planar ultrasonic wave at a different angle relative to the array than the first planar ultrasonic wave;
   (f) combining received signals responsive to the first and second planar ultrasonic waves and at least one Fourier transform.

9. The method of claim 1 wherein (a) comprises transmitting from a two-dimensional array, and further comprising:
   (e) applying an inverse Fourier transform to data responsive to (c), the results of (d) corresponding to data representing three dimensions.

10. An ultrasound system for scanning with a wave transmission, the system comprising:
    a transducer array having at least one element;
    a plane wave transmitter electrically connected with the transducer array; and
    a receiver electrically connected with the transducer array, the receiver operable to apply a Fourier transform to data representing received signals of the at least one elements wherein the plane wave transmitter is operative to transmit an ultrasound planar wave at an angle relative to the transducer array, and the receiver is operable to interpolate Fourier transformed frequency data as a function of the angle.

11. The system of claim 10 wherein the plane wave transmitter is operative to transmit an ultrasound planar wave at an angle from a normal to the transducer array, and the receiver is operable to phase shift Fourier transformed data as a function of the angle.

12. The system of claim 10 further comprising a second receiver operable to apply a spatial Fourier transform to Fourier transformed frequency data output from a plurality of elements of the transducer array.

13. The system of claim 10 wherein the receiver is operably to apply a two-dimensional Fourier transform to signals from a plurality of elements of the transducer array.

14. The system of claim 10 wherein the plane wave transmitter is operative to transmit first and second ultrasound planar waves at different angles relative to the array, and the receiver is operable to combine signals responsive to the first and second planar ultrasonic waves and at least one Fourier transform.

15. The system of claim 10 wherein the transducer array comprises a two-dimensional array, and the receiver is operable to output data representing three dimensions.

16. An ultrasound method for scanning with a plane wave transmission, the method comprising:
  (a) transmitting at least a first substantially planar ultrasonic wave into a region;
  (b) receiving signals responsive to (a) at a plurality of elements of an array;
  (c) applying a two-dimensional Fourier transform to the signal; and
  (d) applying an inverse Fourier transform to data responsive to (c).

17. The method of claim 16 wherein (a) comprises transmitting from a two-dimensional array, and wherein the results of (d) correspond to data representing three dimensions.

18. An ultrasound system for scanning with a plane wave the system comprising:
  a transducer array having a plurality of elements;
  a plane wave transmitter electrically connected with the transducer array;
  a receiver electrically connected with the transducer array, the receiver operable to apply a two-dimensional Fourier transform to data from the plurality of elements.

19. The system of claim 18 wherein the transducer array comprises a two-dimensional array, and the receiver is operable to output data representing three dimensions.

20. An ultrasound method for scanning with a plane wave transmission, the method comprising:
  (a) transmitting into a region at least a first substantially planar ultrasonic wave at an angle from a normal to an array;
  (b) receiving signals responsive to (a) at an element of the array;
  (c) applying a Fourier transform to the signals; and
  (d) altering Fourier transformed frequency data as a function of the angle the altering including interpolating the Fourier transformed frequency data as a function of the angle.

21. The method of claim 20 wherein (c) comprises applying the Fourier transform to radio frequency signals from the element.

22. The method of claim 20 wherein (d) comprises phase shifting the Fourier transformed frequency data as a function of the angle.

23. The method of claim 20 further comprising:
  (e) repeating (c) and (d) for each of a plurality of elements of the array; and
  (f) applying a spatial Fourier transform to the phase shifted, Fourier transformed frequency data.

24. The method of claim 20 further comprising:
  (e) applying a spatial Fourier transform to the Fourier transformed frequency data;
  wherein (d) comprises interpolating Fourier transformed frequency data responsive to (c) and (e).

25. The method of claim 20 further comprising:
  (e) transmitting at least a second substantially planar ultrasonic wave into the region, the second planar ultrasonic wave at a different angle relative to the array than the first planar ultrasonic wave;
  (f) combining received signals responsive to the first and second planar ultrasonic waves and at least one Fourier transform.

26. The method of claim 20 wherein (a) comprises transmitting from a two-dimensional array, and further comprising:
  (e) applying an inverse Fourier transform to data responsive to (d), the wherein the results of (e) correspond to data representing three dimensions.

27. An ultrasound system for scanning with a plane wave transmission, the system comprising:
  a transducer array having a plurality of elements;
  a plane wave transmitter electrically connected with the transducer array, the plane wave transmitter operable to transmit an ultrasound planar wave at an ankle from a normal to the transducer array;
  a receiver electrically connected with the transducer array, the receiver operable to apply a Fourier transform to received signals and operable to alter Fourier transformed frequency data as a function of the angle the receiver is operable to interpolate Fourier transformed frequency data as a function of the angle.

28. The system of claim 27 wherein the receiver is to phase shift Fourier transformed data as a function of the angle.

29. The system of claim 28 further comprising a second receiver operable to apply a spatial Fourier transform to the phase shifted, Fourier transformed frequency data output from the plurality of elements.

30. The system of claim 27 wherein the plane wave transmitter is operative to transmit two ultrasound planar waves at different angles relative to the array, and the receiver is operable to combine signals responsive to the first and second planar ultrasonic waves and at least one Fourier transform.

31. The system of claim 27 wherein the transducer array comprises a two-dimensional array, and the receiver is operable to output data representing three dimensions.

32. An ultrasound method for scanning with a plane wave transmission, the method comprising:
  (a) transmitting into a region at least first and second substantially planar ultrasonic waves at different angles relative to the array;
  (b) receiving first and second signals responsive to the first and second planar ultrasonic waves, respectively, at the array;
  (c) applying a Fourier transform to the first and second received signals; and
  (d) combining first and second data responsive to application of the Fourier transform of (c) to the first and second received signals, respectively; and (e) interpolating the first and second Fourier transformed frequency data as a function of first and second angles, respectively, prior to (d) the first and second angles corresponding to the different angles of the first and second planar ultrasonic waves.

33. The method of claim 32 wherein (d) comprises combining first and second Fourier transformed frequency data.

34. The method of claim 32 further comprising:
(f) applying an inverse Fourier transform to the Fourier transformed first and second signals;
wherein (d) comprises combining first and second inverse Fourier transformed spatial domain data.

35. The method of claim 32 wherein (d) comprises combining data associated with three or more ultrasonic plane waves.

36. The method of claim 32 wherein (c) comprises applying the Fourier transform separately to radio frequency signals from each element.

37. The method of claim 32 further comprising:
(f) phase shifting the Fourier transformed first and second received data as a function of the different angles.

38. The method of claim 32 further comprising:
(f) applying a spatial Fourier transform to the Fourier transformed first and second received signals prior to (d).

39. The method of claim 32 wherein (a) comprises transmitting from a two-dimensional array, and further comprising:
(f) applying an inverse Fourier transform to data responsive to (c), the wherein the results of (e) correspond to data representing three dimensions.

40. An ultrasound system for scanning with a plane wave transmission, the system comprising:
a transducer array having a plurality of elements;
a plane wave transmitter electrically connected with the transducer array, the plane wave transmitter operatable to transmit two ultrasound planar waves at different angles relative to the array;
a receiver electrically connected with the transducer array, the receiver operable to combine signals responsive to the first and second planar ultrasonic waves and at least one Fourier transform, the receiver is operable to interpolate Fourier transformed frequency data as a function of the different angles, the Fourier transformed frequency data corresponding to the first and second planar ultrasonic waves.

41. The system of claim 40 wherein the receiver is to phase shift Fourier transformed data corresponding to the first planar ultrasonic wave, the phase shift a function of a first angle of the first planar ultrasonic wave to a normal of the array.

42. The system of claim 40 wherein the receiver is operable to combine signals responsive to the first and second planar ultrasonic waves after application of an inverse Fourier transform.

43. The system of claim 4 wherein the receiver is operable apply an inverse Fourier transform to the combined signals.

44. The system of claim 31 wherein the transducer array comprises a two-dimensional array, and the receiver is operable to output data representing three dimensions with a three-dimensional Fourier transform.

* * * * *